Figure 1:
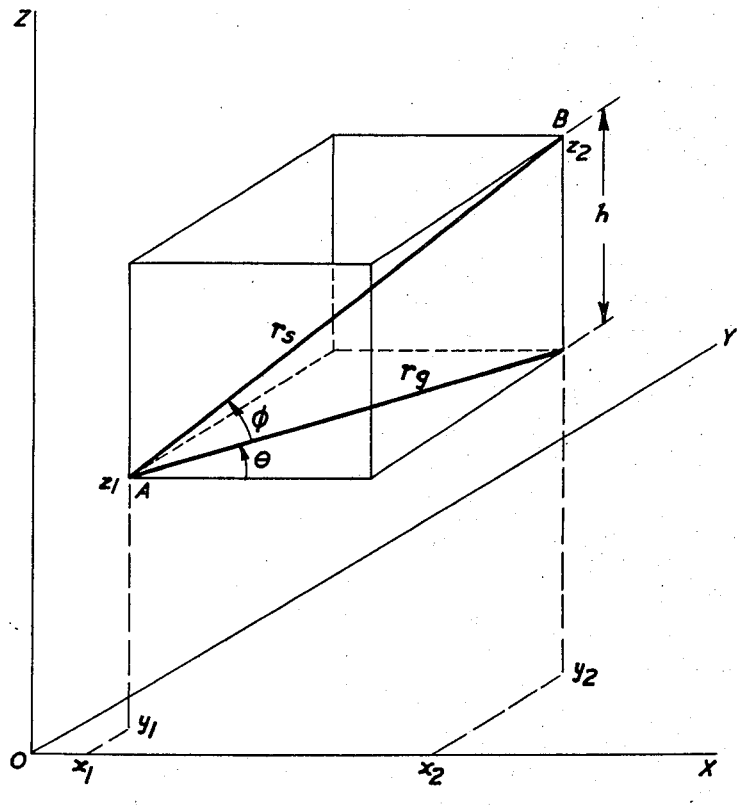

Feb. 16, 1960   J. W. SWIFT   2,924,892
APPARATUS FOR SIMULATING RADAR DETECTION EQUIPMENT
Filed Aug. 20, 1956   2 Sheets-Sheet 1

INVENTOR
JAMES W. SWIFT
BY Watson, Cole, Grindle
& Watson  ATTORNEYS

Feb. 16, 1960   J. W. SWIFT   2,924,892
APPARATUS FOR SIMULATING RADAR DETECTION EQUIPMENT
Filed Aug. 20, 1956   2 Sheets-Sheet 2

INVENTOR
JAMES W. SWIFT

United States Patent Office 2,924,892
Patented Feb. 16, 1960

2,924,892

APPARATUS FOR SIMULATING RADAR DETECTION EQUIPMENT

James Walter Swift, Crawley, England, assignor to Communications Patents Limited Application August 20, 1956, Serial No. 604,872

Claims priority, application Great Britain August 25, 1955

5 Claims. (Cl. 35—10.4)

This invention relates to radar simulating apparatus.

It has been proposed to produce synthetic data relating to the range and direction of a simulated target and to use this data to provide synthetic echoes on a radar display screen for training or other purposes. An exercise carried out in this manner has the advantages that it is much less expensive than an exercise which involves the flying of real aircraft, either as targets or as carriers for the radar equipment, and that it can be repeated in exactly the same form, if desired.

It is an object of the present invention to provide improved apparatus for simulating radar equipment (for example, for evaluating the success of landing approaches) of the kind which radiates an angularly movable scanning beam.

One use of such apparatus is the training of pilots in locating other aircraft by radar. A further use is the provision of information regarding the range and direction of a target for the purpose of training personnel in, for example, anti-aircraft gunfire control.

According to one aspect of the invention, apparatus for simulating radar equipment of the kind which radiates an angularly-movable scanning beam, includes means arranged to provide alternating electric signals representing the position coordinates of a target and a radar aerial with respect to a reference point in a given plane, the amplitudes of the signals representing distances and their phases representing the directions in which the distances are measured, means responsive to the said co-ordinate signals to provide a first alternating voltage representing by its amplitude and phase the distance and bearing of the target from the radar aerial in the said plane, means adapted to provide a second alternating voltage which is in phase quadrature with the first alternating voltage, means for modulating the amplitude of the second alternating voltage in accordance with the distance between the target and the radar aerial in a direction perpendicular to the said plane, means controlled by the first and second voltages to generate a third alternating voltage representing in amplitude the slant range of the target from the radar aerial, and means utilizing said third alternating voltage to establish an appropriate display.

According to a further aspect of the invention, apparatus for simulating radar equipment of the kind which radiates an angularly-movable scanning beam, includes means arranged to provide two alternating electric signals of quadrature phase representing by their amplitudes the Cartesian position co-ordinates of a target with respect to a radar aerial in a given plane, means responsive to the said co-ordinate signals to provide a first alternating voltage representing by its amplitude and phase the distance and bearing of the target from the radar aerial in the said plane, means adapted to provide a second alternating voltage which is in phase quadrature with the first alternating voltage, means for modulating the amplitude of the second alternating voltage in accordance with the distance between the target and the radar aerial, in a direction perpendicular to the said plane, means controlled by the first and second voltages to produce a third alternating voltage representing in amplitude the slant range of the target from the radar aerial, and means utilizing said third alternating voltage to establish an appropriate display.

According to a feature of the invention, the apparatus includes means serving to produce first and second electrical impulses such that the time interval between these two impulses is substantially representative of the relative angular relationship of the radar scanning beam and the target aircraft in a given plane, first phase comparison means operable in accordance with the time relationship of these impulses, a first gate circuit controlled by the said first phase comparison means, means serving to produce third and fourth electrical impulses such that the time interval between these latter impulses is substantially representative of the relative angular relationship of the radar scanning beam and the target aircraft, in a plane normal to the given plane, second phase comparison means operable in accordance with the time relationships of these latter impulses, a second gate circuit controlled by this second phase comparison means and means associated with the two gate circuits whereby a signal passes through the gate circuits when the direction of the scanning beam coincides with that of the target from the radar aerial.

According to a further feature of the invention a voltage, the amplitude of which represents the said slant range, is used in conjunction with a time base, associated with a cathode ray tube, to provide simulated echo pulses delayed in accordance with the slant range, these pulses being applied to the cathode ray tube through the two gate circuits when each of the said gate circuits is open.

Figure 2:
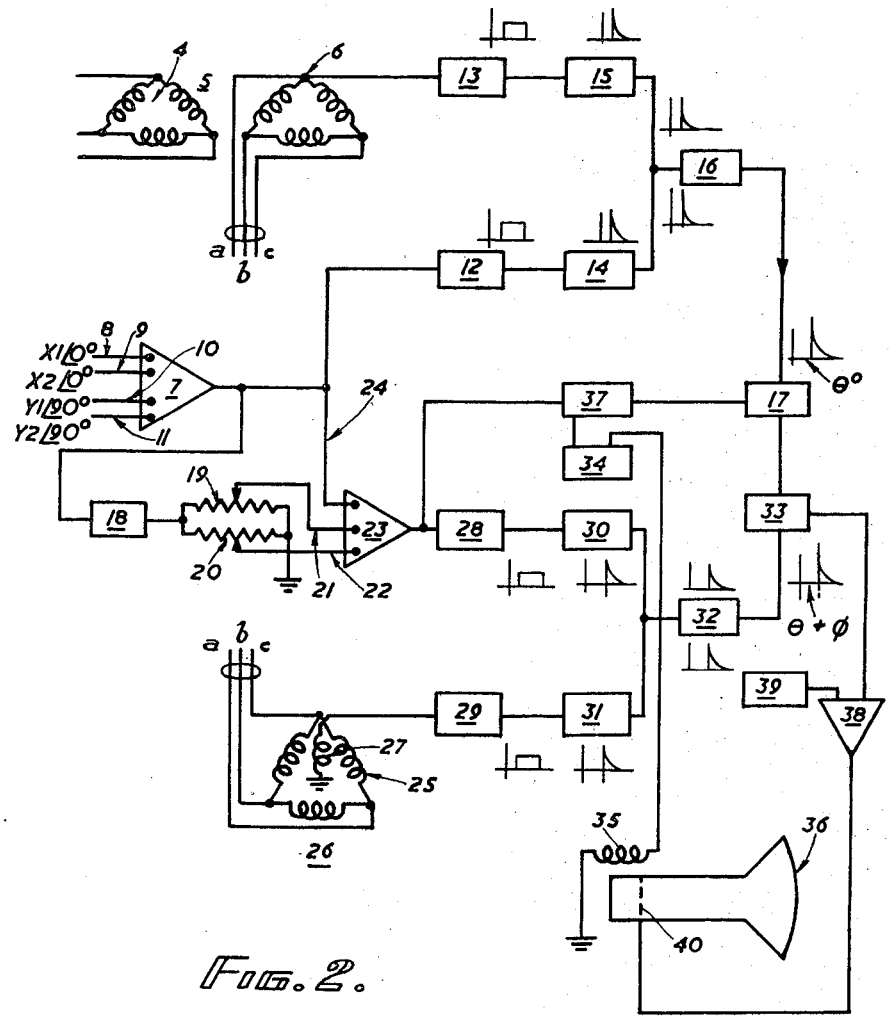

In order that the invention may be better understood a preferred embodiment thereof will now be described, by way of example only, with reference to the accompanying drawings in which:

Figure 1 is a diagram showing the assumed relative positions of a target and an aircraft carrying a radar aerial, and Figure 2 is a block schematic diagram of the preferred embodiment of the invention.

In Figure 1, point A represents the assumed position of a radar carrying aircraft, and point B that of a target aircraft, point A being specified by the co-ordinates $x_1$, $y_1$, $z_1$, and point B by the co-ordinates $x_2$, $y_2$, $z_2$, each with respect to the origin O of a system of co-ordinate axes X, Y, Z, representing north south directions, east west directions and altitude respectively. Angle $\theta$ represents the bearing of a radar scanning beam assumed to originate from a radar unit carried on the aircraft at A, $r_g$ being representative of the ground range between the two aircraft, where $r_g$ is the resultant of distances represented by $(x_2-x_1)$ and $(y_2-y_1)$ mutually at right angles and angle $\theta$ is given $$\tan^{-1}\frac{y_2-y_1}{x_2-x_1}$$

The slant range $r_s$, shown by the line $r_s$ on Figure 1, is the resultant of the relative altitude $z_2-z_1$ i.e. $h$, of the two aircraft and the ground range $r_g$, these distances being mutually at right angles. The angle of elevation $\phi$ of the aircraft at B with respect to that at A is given by $$\phi=\tan^{-1}\frac{h}{r_s}$$

By simulating these position co-ordinates and angles in the manner hereinafter to be described, a representation of the signal features of a radar apparatus is achieved to enable a pupil to be trained in the use of such apparatus or provide simulated radar equipment for allied applications.

Referring now to Figure 2, the stator 4 of a synchro 5 is supplied with a three-phase 1600 c.p.s. voltage of substantially constant amplitude and sinusoidal waveform, the rotor of this synchro being rotated in accordance with the assumed angular movement of a radar scanner in the horizontal plane. The three-phase stator sets up a rotating field of constant amplitude in response to the applied three-phase voltages, so that the induced rotor volts are constant in amplitude but vary in phase according to the angular position of the rotor with respect to the stator. Hence the voltage taken from a terminal 6 of the rotor varies in phase in accordance with the direction of radiation of the assumed radar beam in a horizontal plane. Any reference phase can be selected on the three-phase side.

Alternating voltages, representative of the $x$ and $y$ co-ordinates of the co-ordinate system, are obtained in any desired suitable manner, for example, they can be derived from position co-ordinate potentiometers (not shown) associated with a chart used for plotting the true course of the two aircraft. Advantageously, these co-ordinate potentiometers are energized by a two-phase supply which is obtained, in any suitable known manner, from the three-phase supply which energizes the synchro 4 so that all points in the system can be electrically related to a given reference point on the three-phase input side. In some cases, a stable oscillator can be used as a main power supply source from which the three-phase and the two-phase supplies are derived in any desired suitable manner. Thus, there are obtained alternating voltages $X_2$ and $X_1$ having a phase angle of 0°, the amplitudes of which represent respectively the north south distances of the target and the aircraft on which the radar unit is carried, with respect to the reference point O formed by the intersection of the system of three co-ordinate axes. In addition, there are obtained alternating voltages $Y_2$ and $Y_1$ having a phase angle of 90° and representative respectively of the east west positions of the target and the radar carrying aircraft, again with respect to the reference point O. These two sets of alternating voltages are supplied to a summing amplifier 7 by way of conductors 8, 9, 10 and 11 respectively the resulting output of this amplifier being a voltage the amplitude of which represents the ground range $r_g$ of the target aircraft, with respect to the scanner unit of the radar carrying aircraft, and the phase of which represents the bearing $\theta$. This can be seen with reference to Figure 1, in which $(x_2-x_1)$ represents the relative displacement of the two aircraft along the north south axis, and $(y_2-y_1)$ represents the relative displacement along the east west axis, $r_g \angle \theta$ being the vector resultant of these signals, where $r_g$ is the ground range and $\theta$ the bearing in degrees. As the X and Y signals are representative of the true course of the two aircraft, the voltage output of amplifier 7 is representative of the true range and bearing of the target aircraft, with respect to the radar carrying aircraft.

The voltage output of the amplifier 7 and the signal from the rotor terminal 6 are applied to circuits 12 and 13 respectively, which produce square waveforms in response to sinusoidal signals and operate over a wide range of signal inputs. These square waves are applied to differentiating circuits, 14 and 15 respectively, the output from each of these circuits being an impulse the amplitude of which will be determined by the finite rise time of the square wave pulses. These impulses, derived from the differentiated signals representative of radar scanner bearing and true bearing of the two aircraft, are applied to a phase concidence circuit 16 which operates to open a horizontal gate circuit 17 when the two impulses are substantially in time coincidence, the impulses then being additive. This time coincidence occurs when the radar scanner bearing is substantially the same as the true bearing of the target aircraft relative to the radar carrying aircraft.

The output of the amplifier 7 is also applied to an amplitude limiting and phase shifting circuit 18 from which is obtained a signal having a phase angle of $(\theta+90°)$ and of unit magnitude this signal being applied to potentiometers 19 and 20 respectively, the wipers of which are adjusted in accordance with the altitudes $Z_1$ and $Z_2$ respectively, of the two aircraft with respect to the reference point O. The outputs of the two potentiometers 19 and 20 are applied by way of conductors 21 and 22 to a summing amplifier 23, to which there is also applied, by way of conductor 24, an output signal from the amplifier 7.

The output of amplifier 23 is determined as follows: From amplifier 7 is derived a signal voltage $r_g \sin(wt+\theta)$ where $r_g$ is a voltage representative of the relative ground range of the two aircraft, and where $\theta$ is the relative bearing, $wt$ being the angular frequency of the supply to the summing amplifier 7, which is of the alternating current type. The voltage which appears between terminals 21 and 22 is of the form $h \sin(wt+\theta+\pi/2)$ namely a height modulated signal with amplitude discrimination against the ground range signal $r_g$ and shifted in phase by 90° with respect to the input to amplifier 23 via terminal 24, where $h$ is a voltage the magnitude of which is representative of the relative altitude of the two aircraft i.e. of $z_2-z_1$, as shown in Figure 1. Hence the effective input to amplifier 23

$$=r_g \sin(wt+\theta)+h \sin(wt+\theta+\pi/2)$$
$$=r_g \sin(wt+\theta)+h \cos(wt+\theta)$$

and the output of amplifier 23

$$=K[r_g \sin(wt+\theta)+h \cos(wt+\theta)] \quad (1)$$

where K is the amplifier gain constant. But $$\tan \phi = \frac{h}{r_s} \text{ from Figure 1}$$

so that $$h=r_g \tan \phi \quad (2)$$

where $\phi$ is the angle of elevation of the second aircraft with respect to the first.

Substituting for $h$ in Equation 1 we get

Amplifier output $$=K[r_s \sin(wt+\theta)+r_s \tan \phi \cos(wt+\theta)]$$
$$=Kr_s\left[\sin(wt+\theta)+\frac{\sin \phi}{\cos \phi} \cos(wt+\theta)\right]$$
$$=Kr_s\frac{\sin(wt+\theta)\cos\phi+\cos(wt+\theta)\sin\phi}{\cos \phi}$$
$$=Kr_s\frac{\sin(wt+\theta)\cos\phi+\cos(wt+\theta)\sin\phi}{r_s/r_s}$$

Since $\cos \phi = \frac{r_s}{r_s}$ from Figure 1

∴ amplifier output
$$=Kr_s[\sin(wt+\theta)\cos \phi+\cos(wt+\theta)\sin \phi]$$
$$=Kr_s \sin(wt+\theta+\phi)$$

It can be seen that the amplifier output has an amplitude directly proportional to the slant range $r_s$ and has an output phase angle representing the sum of the true elevation and train angles $\phi$ and $\theta$ respectively.

The three terminals of the rotor of the synchro 5 are connected to the three terminals of the stator 25 of a further synchro 26, the signals from this rotor having a phase angle of $\theta°$ when the "horizontal" gate 17 is open. The rotor 27 of the synchro 26 is rotated in accordance with the assumed angle of elevation of the scanning beam, so that the phase angle of the voltage induced in this rotor represents the sum of the elevation and train angles of the scanning beam. The output signal from amplifier 23 and the signal from the rotor 27 are applied, through squaring circuits 28 and 29 and differentiating circuits 30 and 31 respectively, to a phase coincidence circuit 32 which opens a "vertical" gate 33 when the two signals are substantially in time coincidence.

In this embodiment the radar aerial scan to be simulated is helical, the aerial unit having two degrees of freedom, and to simulate appropriate angular scanning relationships the rotors of the synchros 5 and 26 are rotated to generate signals representative of the scanner bearing and elevation respectively. The horizontal and vertical gates will be open together when the radar beam is in correct alignment with the target in both the ground plane and the vertical plane. It is to be noted that the signals opening the horizontal and vertical gates will in general be displaced by $\phi$ degrees so that the horizontal gate must be held open for a time interval representative of the angle $\phi$ to await acceptance of the height modulated signal.

To simulate range and to provide a display representative of this the output signal from amplifier 23, the amplitude of which represents slant range, and a range signal from a time base 34, which also energizes the deflection coil 35 of a cathode ray display tube 36, are applied to an echo generator 37 which includes an amplitude comparator and produces a short pulse, simulating a radar echo, when the amplitudes of the voltage representing slant range and the time base voltage become equal. The time base 34 is synchronized with the 1600 c.p.s. supply, so that points along it are a measure of phase. To enable 360° electrical degrees to be traversed the time base frequency is set to half the supply frequency, thereby ensuring that the intersection of the range signal with the time base does not occur within the region of the time base wave form in which discontinuities occur. The greater the magnitude of the slant range signal the greater the time which will elapse before the amplitude of the time base voltage becomes equal to this range signal, so that range is translated to a time delay, and the echo generator provides an echo pulse delayed in time by an interval representative of the slant range. This pulse output is applied, through gates 17 and 33, when these gates are both open, to one input terminal of an amplifier 38. Signals representative of noise, permanent echoes, or other gated pulses are fed to the second input terminal of this amplifier from a source 39 and the amplifier output is fed to the control grid 40 of the display tube 36. By a suitable mechanical means (not shown) the deflection coil 35 is rotated in accordance with the assumed bearing $\theta$ of the two aircraft. With this arrangement the cathode ray tube display comprises a background of noise and permanent echoes, superimposed on which will appear an intensified spot at a radial distance, from a reference point on the screen, representative of slant range, and of angular displacement, with respect to given screen axes, representative of the bearing $\theta$.

The sensitivity of the system as herein described can be modified by varying the amplitude of the output of the time base 34.

The invention is not limited to the type of cathode ray tube display described above, neither is it limited to a helical type radar scan. It is visualized that spiral scanning, or a combination of spiral scan with conical scan (Palmer type scan) could be used. This would merely entail positioning the synchro rotors in accordance with the angular movements of the radar scan intended to be simulated. In addition by using one of the gating systems only a fan or cosec squared beam can be simulated, this type of beam finding particular application in aircraft for mapping a given surface or in ship radar applications. Further, the bandwidth of the radar beam may readily be varied by altering the electrical tolerances of the gating circuit or circuits employed.

What I claim is:

1. Apparatus for simulating the screen display of radar detection equipment of the type which emits a scanning beam movable angularly over the whole of a scanning field and produces a display mark on the screen at a point representing by its angular position the bearing of a target from the radar equipment and by its distance from an origin the slant range, comprising a summing amplifier to which alternating voltage quadrature signals are fed, which signals represent by their amplitude the position co-ordinates of a target and of the radar equipment, said summing amplifier producing a first alternating control voltage which represents by its amplitude the distance between the detecting equipment and the target and by its phase relatively to a reference phase the bearing of the target relatively to the equipment, means to produce a second alternating control voltage in phase quadrature with the first alternating control voltage, means to modify the amplitude of said second alternating control voltage in dependence upon the relative height between the equipment and the target, a summing amplifier to produce a third control voltage, said summing amplifier receiving inputs consisting of the said first and second control voltages, the amplitude of the third control voltage being dependent upon and representing the slant range, a phase comparator receiving as its inputs the first control voltage on the one hand and an alternating voltage, the phase angle of which varies in accordance with the assumed angular scanning movement of the radar beam in one plane on the other hand, a horizontal gate responding to electric pulses received from the phase comparator in the event of phase coincidence of the first control voltage and of the said alternating voltage, a further phase comparator receiving as its inputs the third control voltage on the one hand and a further alternating voltage, the phase angle of which varies in accordance with the assumed angular value scanning movement of the radar beam in a different plane on the other hand, a vertical gate receiving as its inputs electric pulses received in the event of phase coincidence of the input voltages to the phase comparator, display means for simulating a radar display, said display means including a cathode ray display tube, a deflection coil and a control electrode for the tube and means to energize the electrode from the horizontal and vertical gates to cause the electron beam of the display tube to permit the production of a display on the face of the tube when the radar scanning beam would produce an echo from the target, said deflection coil being actuated to deflect the electron beam in a direction according to the assumed target bearing.

2. Apparatus according to claim 1 wherein the said alternating voltages the phase angles of which vary in accordance with the assumed scanning movement of the radar beam in said first plane and said different plane, respectively, are derived from synchro units receiving rotational components representing said two movements to provide two alternating voltage signals the phase angle of which relatively to a reference phase represents the angular components of movement of the antenna.

3. Apparatus according to claim 1 wherein the third alternating control voltage representing slant range is compared with a second voltage of repetitive progressively changing wave form to produce a signal when the two voltages are of equal amplitude, subject to a time delay depending on the slant range, and said signal is transmitted to the display tube so as to produce the display at the correct position from the origin point to represent the slant range.

4. Apparatus according to claim 3 wherein the repetitive wave form is produced by a time base circuit, the output of which is synchronized with the control voltages and is fed both to deflection means for the display tube and also to an echo generator which compares the repetitive wave form with the third alternating control voltage to produce a simulated echo pulse subject to a time delay representative of the time delay of receipt of an echo pulse from actual radar equipment.

5. Apparatus according to claim 3 comprising means to add additional signals to the circuits controlling the display on the cathode ray tube selected to provide a natural display simulating the display of actual radar equipment.

References Cited in the file of this patent

UNITED STATES PATENTS

| | | |
|---|---|---|
| 2,428,800 | Holden | Oct. 14, 1947 |
| 2,693,647 | Bolster | Nov. 9, 1954 |